United States Patent Office 3,743,705
Patented July 3, 1973

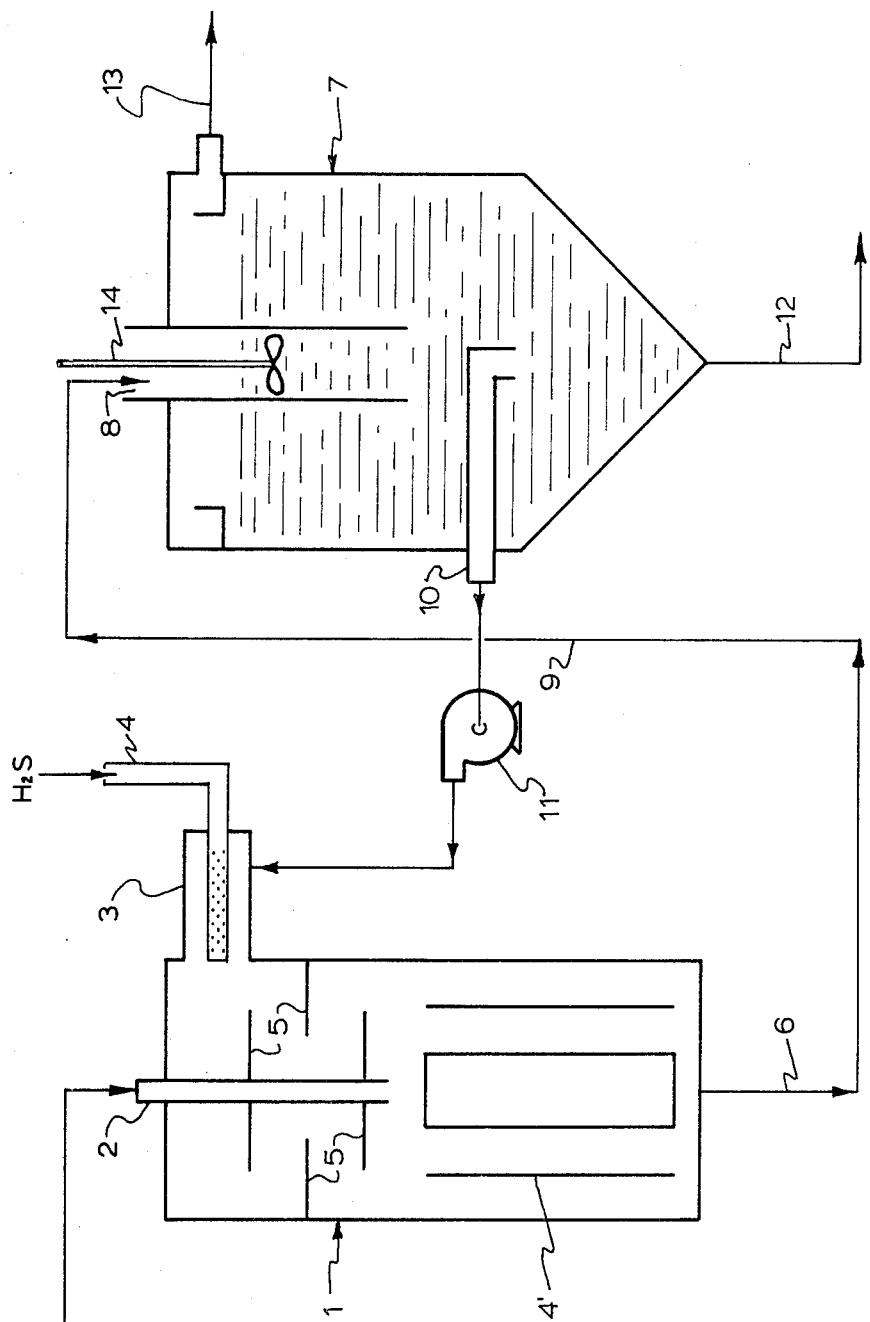

3,743,705
PROCESS OF RECOVERING COPPER VALUES
Clark A. Sumner, Orange, Calif., assignor to Stauffer Chemical Company, New York, N.Y.
Continuation-in-part of application Ser. No. 20,002, Mar. 16, 1970. This application Oct. 12, 1971, Ser. No. 188,545
Int. Cl. C01g 3/12, 3/00
U.S. Cl. 423—561                2 Claims

ABSTRACT OF THE DISCLOSURE

A process of recovering metal values is described herein. The process involves the reaction of a soluble metal in solution with hydrogen sulfide to form solid metal sulfide crystals. A portion of the metal sulfide is recycled and contacted with the hydrogen sulfide which is adsorbed onto the surface of the solid metal sulfide. When the soluble metal contacts the adsorbed hydrogen sulfide, larger metal sulfide crystals are formed that can readily be recovered by thickening and filtration procedures.

CROSS REFERENCE TO RELATED APPLICATION

This application is a continuation-in-part of copending application Ser. No. 20,002, filed Mar. 16, 1970, entitled Process of Recovering Metal Values, now abandoned.

BACKGROUND OF THE INVENTION

In the art of recovering metal values from metal bearing ores, and the like, it is the practice to leach the metal values from the ores and recover the resulting soluble salts of the metals. Examples of metals recoverable by this system are Cu, Zn, Ni, Mn, Fe, Co, Cd, Pb, Ag, Hg and Se.

Since the metal is in a solution, it is necessary to treat it with various reagents or processes to convert it to a solid or precipitate which is then separated from the solution. In precipitates, this is usually brought about by thickening the solid-liquid mixture and then filtering the thickened medium.

One conventional treating reagent is hydrogen sulfide. Thus, when hydrogen sulfide is contacted with the metal in solution, an insoluble metal sulfide is formed. It has been found in practice, however, that the solid metal sulfides formed by this method are so small in size that it gives rise to a colloidal system. That is, the particles formed have a very large surface area per unit volume such that they will float. In fact, this collidal type system can either be readily thickened nor filtered, and thus, complex and expensive systems were required to recover the metal values. In general, the average particle size distribution will range between about 0.05 and 0.25 micron. This problem is particularly acute when attempting to recover copper values from leach solutions.

BRIEF DESCRIPTION OF THE INVENTION

It has been discovered that large recoverable crystals or agglomerates of insoluble metal sulfides can be formed with hydrogen sulfide. This is brought about by recycling a portion of the colloidal metal sulfide and treating it with hydrogen sulfide. This forms an adsorbed layer of hydrogen sulfide around each colloidal particle of metal sulfide, giving rise to a metal sulfide-hydrogen sulfide complex. When the soluble salts of the metal contact the hydogen sulfide-sulfide complex, a large crystal or agglomerate of metal sulfide is formed. Thus, the smaller colloidal particles are used as seeds or nuclei to form larger agglomerates, or crystals, or both that can be readily concentrated, thickened, and/or filtered in the conventional manner.

BRIEF DESCRIPTION OF THE DRAWINGS

The single figure is a schematic diagram illustrating the process of the present invention.

DETAILED DESCRIPTION OF THE INVENTION

In the practice of the present invention, a soluble solution of metal is obtained from leaching. The solutions are injection into a reactor 1 at inlet 2. Simultaneously, hydrogen sulfide is injected into the reactor 1 through sparger 3 at inlet 4. As the hydrogen sulfide contacts the soluble solution of metal, metal sulfides are formed. In order to insure a complete reaction, a restricted portion 4' is provided at the lower end of reactor 1. This restricted portion forms turbulent flow of the solution to obtain maximum effective contact between the soluble solution of metal and hydrogen sulfide to form metal sulfides. The resulting metal sulfides are colloidal in nature.

The metal sulfide solid and solution are removed at 6, from reactor 1 and injected into a settling vessel 7 at 8 by conduit 9. A portion of the colloidal metal sulfide solution is removed at 10 and pumped by means 11 back into sparger 3 where it contacts the hydrogen sulfide. The hydrogen sulfide will adsorb onto each metal sulfide particle to form a metal sulfide-hydrogen sulfide complex. In order to insure complete contact between the colloidal system and the hydrogen sulfide baffles 5 are provided. Thus, when additional soluble solution of metal contacts the hydrogen sulfide-metal sulfide complex, the hydrogen sulfide adsorbed on the metal sulfide particle will react therewith and will form larger crystals or agglomerates of metal sulfide, which can be readily concentrated, thickened, and/or filtered in a conventional manner.

In practice of the present invention, it is essential that no substantial amount of gaseous hydrogen sulfide be present in reactor 1 at zone 4. The amount of metal sulfide solution recycled can range between about 1:1 and about 35:1. The amount of recycled solution used is determined by the amount of metal sulfide nuclei and their surface area so that substantially all gaseous hydrogen sulfide is adsorbed. The flow rate of hydrogen sulfide is controlled by the amount of raw feed soluble metal content. This is generally controlled in a conventional manner by measuring the redox potential on the reactor effluent.

When the crystals or agglomerates, or both, of metal sulfide have grown to a size distribution of between about 3 and 100 microns, they are removed from the settling vessel 7 at the lower end 12 and conveyed to a concentrator, thickener, and/or filter in a conventional manner. The clear overflow is removed at 13. As illustrated, an optional agitator 14 is provided in vessel 7 to promote rapid settling of the metal sulfide crystals or agglomerates. It has been found in practice that the increased particle size distribution provides substantial increases in settling rates of up to about 1.2 ft./hr. as opposed to about 0.43 ft./hr. for conventional particle size of from about 0.05 to 0.25 micron. Moreover, cake formation rates of about 1.25 to 42.00 lbs./ft.$^2$/hr. are obtained as compared to 0.30 to 0.40 lb./ft.$^2$/hr. for conventional particles.

Examples 1–11

Using the system as described above, several runs were made to recover copper values from copper containing solutions. The results of these runs are set forth in Table I.

TABLE I

| Run | Recycle ratio, gal. of recycle/ gal. of feed | Metal content of solution, g./l. Cu | Metal content barren liquor, g./l. Cu | Extraction efficiency, percent | Thickener underflow, percent | | Wet filter cake, percent | | Dry filter cake, percent Cu |
|---|---|---|---|---|---|---|---|---|---|
| | | | | | Solids | Cu | Solids | Cu | |
| 1 [1] | 0:0 | 0.92 | 0.001 | 100.0 | 1.85 | 0.58 | 21.9 | 6.85 | 31.13 |
| 2 | 10:1 | 1.46 | 0.013 | 99.4 | 15.30 | 6.97 | 43.0 | 19.60 | 45.60 |
| 3 | 2:1 | 0.92 | 0.030 | 96.8 | 16.80 | 4.80 | 22.4 | 6.40 | 28.59 |
| 4 | 19:1 | 17.66 | 0.450 | 97.4 | 5.01 | 1.67 | 32.9 | 10.96 | 33.36 |
| 5 | 1.4:1 | 1.80 | 0.140 | 92.2 | 12.60 | 5.49 | | | |
| 6 | 3.4:1 | 1.80 | 0.110 | 93.9 | 10.10 | 5.49 | | | |
| 7 | 2:1 | 1.80 | 0.230 | 87.0 | 10.90 | 6.35 | | | |
| 8 | 3.8:1 | 1.80 | 0.035 | 98.1 | 9.70 | 6.19 | | | |
| 9 | 3.8:1 | 1.80 | 0.037 | 98.0 | 10.00 | 6.50 | | | |
| 10 | 19:1 | 0.14 | 0.010 | 93.0 | 7.37 | 7.22 | | | |
| 11 | 19:1 | 0.14 | 0.013 | 91.0 | 11.50 | 5.73 | | | |

[1] Control.

Examples 12–15

Additional runs were made similarly as in Examples 1–11 to study cake formation rates and particle size distribution. The results of these runs are set forth in Table II.

TABLE II

| Run | Recycle ratio, gal. of recycle/ gal. of feed | Solids in thickened underflow, percent | Particle size distribution, microns | Average particle size, microns | Cake (dry) formation rate, lb./ft.²/hr. |
|---|---|---|---|---|---|
| 1 | [1] 0:0 | 1.94 | 0.05–0.25 | | 0.35 |
| 2 | [2] 17.2:1 | 15.2 | 3.0–75.0 | 25.53 | 41.76 |
| 3 | 11.5:1 | 3.20 | 3.0–75.0 | 24.93 | 1.41 |
| 4 | 33.7:1 | 5.73 | 3.0–75.0 | 25.60 | 4.32 |

[1] Control.
[2] Product from reactor allowed to settle for 48 hours.

What is claimed is:

1. In the process of recovering copper values, wherein a solution containing the copper values is reacted in a reaction vessel with hydrogen sulfide to initially form colloidal insoluble solid copper sulfides having a particle size distribution of about 0.05 to 0.25 micron that are conveyed to a separating system to remove the metal sulfide from the solution; the improvement comprising
   (a) recycling a portion of the colloidal copper sulfide back into the reaction vessel at a ratio of 1.4:1 to 35:1, said ratio being expressed in the amount of recycled metal sulfide to raw feed solution;
   (b) contacting the recycled portion of colloidal copper sulfides with hydrogen sulfide to form a copper sulfide-hydrogen sulfide complex, said hydrogen sulfide being adsorbed onto the recycled metal sulfide particle surface;
   (c) contacting the copper sulfide-hydrogen sulfide complex with the solution containing metal values to form larger particle size copper sulfides having a particle size distribution of between 3 and 75 microns and a cake formation rate of from 1.25 to 42.00 lbs./ft.²/hr.

2. The process as set forth in claim 1 wherein said solution is copper sulfate.

References Cited

UNITED STATES PATENTS

| 1,180,844 | 4/1916 | Greenawalt | 23—135 |
| 2,020,918 | 11/1935 | Stutz | 23—135 X |
| 2,130,382 | 9/1938 | Copeland et al. | 23—135 |
| 2,722,480 | 11/1955 | Roy | 23—135 X |
| 2,726,953 | 12/1955 | Roy et al. | 75—108 |
| 3,168,375 | 2/1965 | Barut et al. | 23—135 |

FOREIGN PATENTS

| 435,287 | 9/1935 | Great Britain | 23—135 |

EDWARD STERN, Primary Examiner

U.S. Cl. X.R.

423—560, 563; 23—301 R